United States Patent Office 3,523,008
Patented Aug. 4, 1970

3,523,008
METHOD FOR PREPARING AN ION EXCHANGER AND ION EXCHANGER PREPARED ACCORDING TO THIS METHOD
Leon Henri Baetsle, Mol, Belgium, assignor to Studiecentrum voor Kernenergie, Brussels, Belgium
Continuation-in-part of application Ser. No. 301,374, Aug. 12, 1963. This application Oct. 3, 1967, Ser. No. 672,632
Claims priority, application Netherlands, Aug. 20, 1962, 282,279
Int. Cl. C22b 59/00
U.S. Cl. 23—23                                         6 Claims

ABSTRACT OF THE DISCLOSURE

A method for preparing an ion exchanger as follows. Admixing to form a precipitate (A) an aqueous solution of $H_4Fe(CN)_6$ with (B) an aqueous mineral acid solution of at least one member of the group consisting of $Na_2MoO_4$ and $Na_2WO_4$ the amounts of (A) and (B) being chosen to form a medium having a pH below 7 and having a concentration of molybdate or tungstate or mixture thereof below 0.5 M and a ratio of Mo or W/Fe of from 2/1 to 8/1 and a ratio of $H^+$/Mo of from 2/1 to 3/1; then washing the thus obtained precipitate with a strong mineral acid; and drying the precipitate.

---

This application is a continuation-in-part of my application Ser. No. 301,374 filed Aug. 12, 1963, entitled "Method for Preparing an Ion Exchanger and Ion Exchanger Prepared According To This Method."

This invention pertains to a method for preparing an ion exchanger which comprises mixing in an acid medium, solutions of $Na_2MoO_4$ and/or of $Na_2WO_4$ with a solution of an inorganic polyvalent compound, and washing and drying at least once the precipitate which is obtained.

According to a known method of this kind, use is made as inorganic polyvalent compound of zirconium sulphate or thorium nitrate. The ion exchangers which are thus obtained can only be used in a medium which is neutral or slightly acid; they cannot operate in an acid medium, for instance in the range of pH 0–2.

The invention has for its purpose to obviate this drawback and to provide a method which enables to prepare an ion exchanger which is usable in an acid medium, for example, to fix from 0.1 to 2 M $HNO_3$, some fission products of uranium, for example caesium 137, strontium 90 and rare earths.

For this purpose, use is made as inorganic polyvalent compound of $H_4Fe(CN)_6$ and the washing is made by means of an acid solution. This last operation is necessary because the precipitate which is obtained does not withstand a washing with water. To be complete, it must be stated that it is already known to put together, in an acid medium, sodium molybdate and a ferrocyanide salt but not for preparing an ion exchanger.

In an advantageous embodment of the invention, the mixture ratio Mo/Fe or W/Fe is about 2/1 against a ratio $H^+$/Mo or $H^+$/W of about 2/1.

In another advantageous embodiment of the invention, the mixture ratio Mo/Fe or W/Fe is about 4/1 to 8/1 against a ratio $H^+$/Mo or $H^+$/W of about 3/1.

Other details and features of the invention will stand out from the description given below of a method for preparing an ion exchanger and of the ion exchanger prepared according to this invention; this description is only given by way of nonlimitative example.

With the above and other objects in view which will become apparent from the detailed description below which will be described with reference to the drawings in which.

Figure 1:
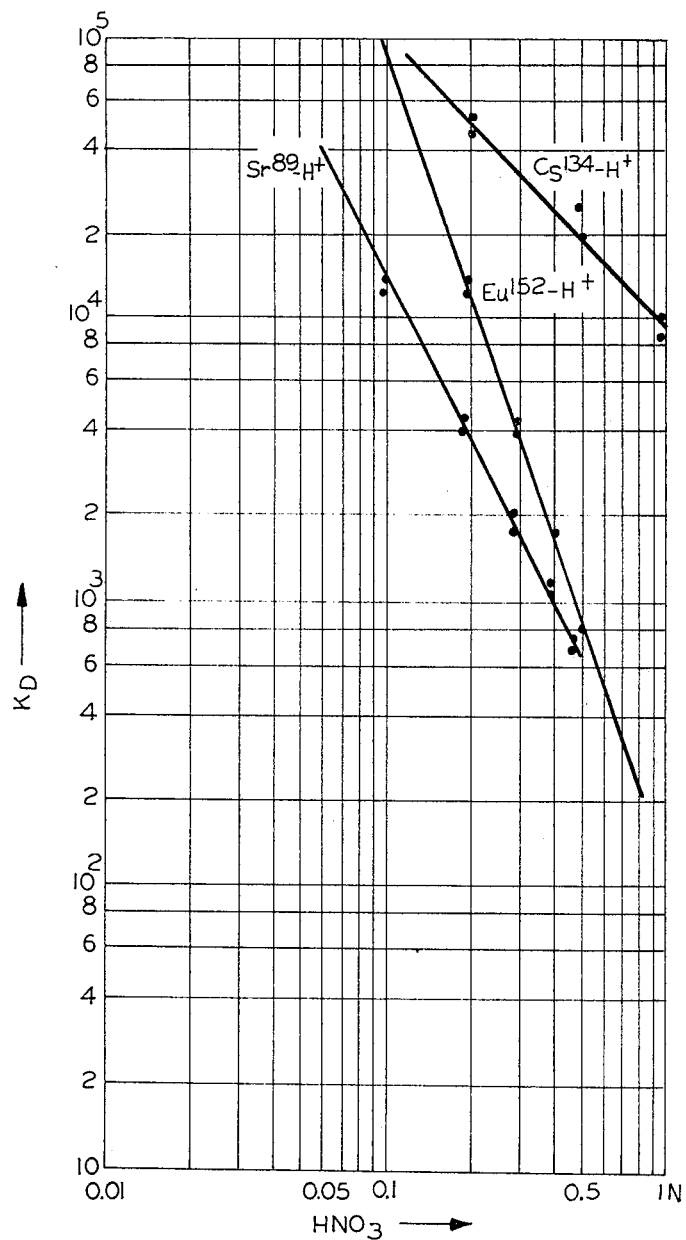
FIG. 1 shows the distribution coefficient of the ions at "trace" concentration on the product secured by the invention.
Figure 2:
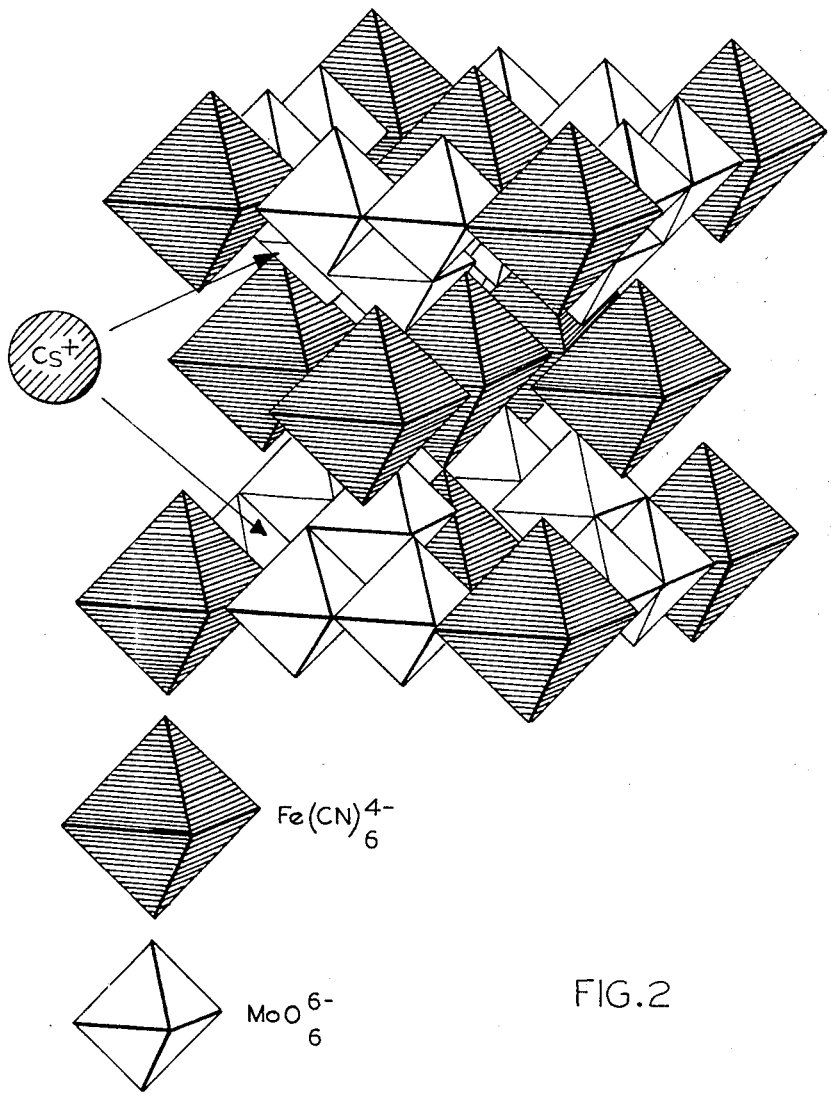
FIGS. 2 and 3 illustrate the structure of the two ion exchangers obtained by the method according to this invention.
Figure 3:
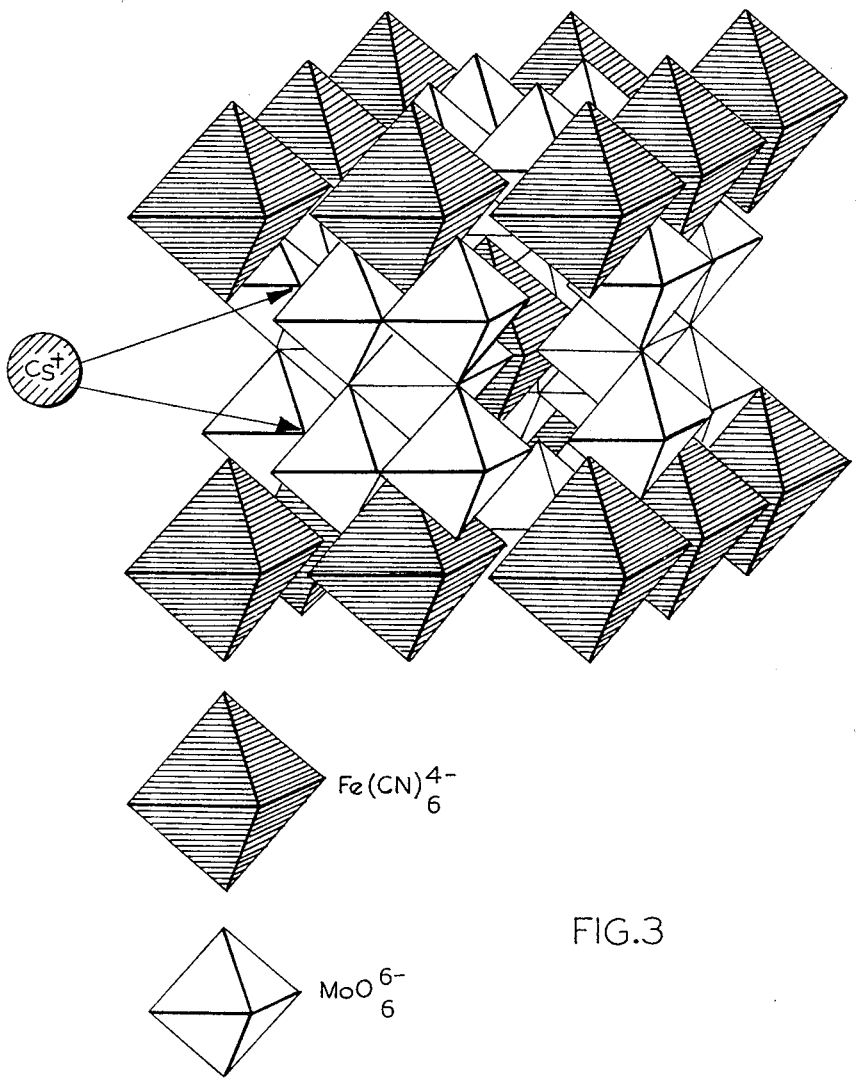

The ion exchanger prepared according to the invention has a three-dimensional lattice consisting of $MoO_6^{6-}$, $Fe(CN)_6^{4-}$ groups, or $WO_6^{6-}$, $Fe(CN)_6^{4-}$ groups, which are joined with bonds of metal, carbon, nitrogen, hydrogen and oxygen. The exchanging function is held by the molybdate or the tungstate, and the ferrocyanide. Consequently the ion exchangers prepared according to the invention are called ferrocyanide molybdate and ferrocyanide tungstate.

For preparing ferrocyanide molybdate, one mixes the two solutions A and B described below. Both solutions have a concentration of 0.2 mole. Solution A is a solution of $H_4Fe(CN)_6$ and solution B is a solution of $Na_2MoO_4$. When both these solutions are mixed, there is formed in acid medium, a precipitate which has ion-exchanging properties. To prepare solution A, $K_4Fe(CN)_6$ is dissolved into water and is contacted with a cation exchanger. The $K_4Fe(CN)_6$ is then changed into $H_4Fe(CN)_6$. The solution is diluted down to a concentration of 0.2 M. The solution thus obtained is solution A.

The solution B is obtained by dissolving $Na_2MoO_4$ directly into a strong acid, for example into HCl, and by bringing the concentration of the molybdate to 0.2 M $Na_2MoO_4$.

The mixture ratios and molybdate/ferrocyanide for the mixing of solutions A and B are chosen so as to maintain the concentration of molybdate below 0.5 M and to obtain a mixture ratio Mo/Fe in the range from 2/1 to 8/1 against a proportion $H^+$/Mo of at least 2/1 to 3/1.

A precipitate is formed by mixing the solutions A and B. This precipitate is then washed with a strong acid, and hereafter dried.

The products which are thus obtained have very good ion exchanging properties in acid medium, particularly at pH 0–2, and they can be used to fix the fission products of uranium, particularly caesium strontium and rare earths.

FIRST EXAMPLE

This example concerns the preparation of ferrocyanide molybdate wherefore a ratio Mo/Fe of 2/1 and a ratio $H^+$/Mo of 2/1 is wished.

To prepare the solution A, $K_4Fe(CN)_6$ is first dissolved into water at room temperature. This solution is then led through a layer of cation exchanger in $H^+$ form, whereby the potassium is fixed on the said layer, and a solution of $H_4Fe(CN)_6$ in water is so obtained. Use can be made, for this purpose, of commercially available $K_4Fe(CN)_6$. As cation exchanger, use can notably be made of Dowex 50 or of Amberlite IR.120. It is necessary to dissolve enough $K_4Fe(CN)_6$ into water in order to have the possibility, after the solution is led through the said layer of cation exchanger, to dilute down the solution of $H_4Fe(CN)_6$ by addition of water to the concentration that has the wished ratio Mo/Fe, with taking into account the concentration of the hereafter described solution B and the mixture ratio of the two solutions. For a ratio Mo/Fe equal to 2/1, the hereafter given concentration of the solution B and a mixture ratio of one volume of the solution A against two volumes of the solution B, the solution of $H_4Fe(CN)_6$ must have a concentration of 0.2 M.

The solution B is obtained by dissolving $Na_2MoO_4$ at a concentration of 0.2 M, directly into a mineral acid such as HCl, at a concentration of 0.4 M. The dissolving process takes place at room temperature.

One volume of the solution A is mixed with two volumes of the solution B. As the solution A has a concentration of 0.2 M, while the solution B with regard to the Na₂MoO₄ has a concentration of 0.2 M, the ratio Mo/Fe is equal to 2/1. As the solution B has a Na₂MoO₄ concentartion of 0.2 M, while one volume of the solution A is mixed with two volumes of the solution B, the concentration of molybdate in the suspension obtained by mixing is equal to 0.2×2/3=0.13 M. As in the solution B the concentrations of the sodium molybdate and of the mineral acid are respectively 0.2 and 0.4, the ratio H⁺/Mo is equal to 2/1. Only the H⁺ of the HCl is taken into account.

A precipitate is formed in the suspension obtained by mixing the solutions A and B. The precipitate that remains after decantation is first washed with HCl at a concentration of 0.4 M. The washed precipitate is then dried at a temperature of 50° C., until the product becomes granular. This drying process can require one or more days. The product is then washed with the same acid, but at a higher concentration, namely 1 M. Finally, the product is dried during a short time, of about half an hour to some hours, at a temperature of 100° C.

The formula of the thus obtained ion exchanger can be represented as follows:

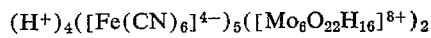

SECOND EXAMPLE

The second example concerns a ferrocyanide molybdate with a ratio Mo/Fe equal to 4/1 and a herewith corresponding ratio H⁺/Mo equal to 3/1. The working process is exactly the same as in the first example, with taking into account that four volumes of the solution B have to be mixed with one volume of the solution A, while the concentration of the mineral acid whereby solution B is obtained is equal to 0.6 M. The mixture ratio Mo/Fe becomes also 4/1. The concentration of molybdate in the suspension becomes 0.2×4/5=0.16 M and the ratio H⁺/Mo becomes 3/1.

The formula of the thus obtained ion exchanger can be represented as follows:

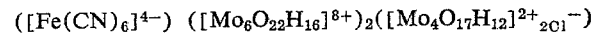

A mixture ratio Mo/Fe of 4/1 to 8/1 against a proportion H⁺/Mo of about 3/1 gives a product with the best ion exchanging properties.

The products which are thus obtained have very good ion exchanging properties in acid medium, particularly at pH 0-2. The best results as regards fixing the fission products of uranium, particularly solutions of Co, Sr, and rare earths in 0.1-2 M.HNO₃, are achieved with a product in which the final ratio Mo/Fe ranges from 3.7 to 4.3. The results of the balance of the ions of the "tracer" of such a product are shown in the accompanying drawings.

Ferrocyanide tungstate can be obtained in a way absolutely similar to the method described above for the ferrocyanide molybdate. The physico-chemical properties are the same as the ones given for the ferrocyanide molybdate, but the ferrocyanide tungstate has a stronger chemical stability, principally in the presence of diluted HNO₃.

The invention is in no way limited to the above embodiments and many changes may be brought therein without departing from the scope of the invention as defined by the appended claims.

I claim:
1. A method for preparing an ion exchanger which comprises:
   (I) admixing to form a precipitate (A) an aqueous solution of H₄Fe(CN)₆ with (B) an aqueous mineral acid solution of at least one member of the group consisting of Na₂MoO₄ and Na₂WO₄ the amounts of (A) and (B) being chosen to form a medium having a pH below 7 and having a concentration of molybdate or tungstate or mixture thereof below 0.5 M and a ratio of Mo or W/Fe of from 2/1 to 8/1 and a ratio of H⁺/Mo or W of from 2/1 to 3/1;
   (II) washing the thus obtained precipitate with a strong mineral acid; and
   (III) drying the precipitate.
2. A method as claimed in claim 1 in which the precipitaate formed by mixing is washed with 0.2 M HCl, the washed product is dried at a temperature of about 50° C., then washed again with 1 M HCl and the final product is dried at about 100° C.
3. A method as claimed in claim 1 in which a solution of 0.2 M Na₂MoO₄ is mixed with a solution of 0.2 M H₄Fe(CN)₆.
4. A method as claimed in claim 1 in which a solution of 0.2 M Na₂WO₄ is mixed with a solution of 0.2 M H₄Fe(CN)₆.
5. A method as claimed in claim 1, in which said solution B is dissolved directly into HCl with a concentration of 0.2-1 M and the final concentration is then adjusted.
6. A method as claimed in claim 1 in which said solution of H₄Fe(CN)₆ is prepared by contacting K₄Fe(CN)₆ with a cation exchanger.

References Cited

Baetsle et al., "Treatment and Storage of High-Level Radioactive Wastes," pub. by International Atomic, Energy Agency, Vienna, February 1963, pp. 553–565 (pp. 561, 562 and 564 of interest).

Liberti, "Annali di Shimica (Rome)," vol. 43, No. 7, November 1953, pp. 443–447.

HERBERT T. CARTER, Primary Examiner

U.S. Cl. X.R.

23—51